(12) United States Patent
Paden et al.

(10) Patent No.: US 8,571,199 B2
(45) Date of Patent: *Oct. 29, 2013

(54) METHOD AND APPARATUS FOR PROPER ROUTING OF CUSTOMERS

(75) Inventors: Jon Paden, Austin, TX (US); Bobby Sams, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/457,988

(22) Filed: Apr. 27, 2012

(65) Prior Publication Data

US 2012/0213342 A1    Aug. 23, 2012

Related U.S. Application Data

(63) Continuation of application No. 11/157,775, filed on Jun. 21, 2005, now Pat. No. 8,204,204.

(51) Int. Cl.
*H04M 3/00* (2006.01)

(52) U.S. Cl.
USPC .............................. 379/265.01; 379/265.02

(58) Field of Classification Search
USPC ...................................... 379/265.01, 265.02
See application file for complete search history.

(56) References Cited

U.S. PATENT DOCUMENTS

| 6,038,293 | A | 3/2000 | McNerney et al. |
| 6,061,433 | A | 5/2000 | Polcyn et al. |
| 6,554,183 | B1 | 4/2003 | Sticha et al. |
| 6,819,748 | B2 | 11/2004 | Weiss et al. |
| 6,819,756 | B2 | 11/2004 | Stumer et al. |
| 7,212,621 | B1 * | 5/2007 | Wallenius et al. ........ 379/221.01 |
| 7,283,963 | B1 | 10/2007 | Fitzpatrick et al. |
| 7,536,002 | B1 | 5/2009 | Ma et al. |
| 7,792,258 | B1 | 9/2010 | Smith et al. |
| 8,204,204 | B2 | 6/2012 | Paden et al. |
| 2001/0014146 | A1 | 8/2001 | Beyda et al. |
| 2002/0034940 | A1 | 3/2002 | Takae et al. |
| 2002/0164011 | A1 | 11/2002 | Stumer et al. |
| 2003/0026409 | A1 | 2/2003 | Bushey et al. |
| 2003/0108183 | A1 * | 6/2003 | Dhir et al. ................ 379/265.01 |
| 2003/0212558 | A1 | 11/2003 | Matula |
| 2004/0059841 | A1 | 3/2004 | Bateman et al. |
| 2004/0071275 | A1 | 4/2004 | Bowater et al. |
| 2004/0122941 | A1 | 6/2004 | Creamer et al. |
| 2004/0215453 | A1 * | 10/2004 | Orbach ......................... 704/231 |
| 2006/0218506 | A1 | 9/2006 | Srenger et al. |
| 2007/0003042 | A1 | 1/2007 | Paden et al. |

\* cited by examiner

*Primary Examiner* — Duc Nguyen
*Assistant Examiner* — Sonia Gay
(74) *Attorney, Agent, or Firm* — Greenblum & Bernstein, P.L.C.

(57) ABSTRACT

A call routing system stores includes a processor that retrieves account information from a storage and identifies a previously provided telecommunications service that was provided to the party based on the account information. The processor restricts access to telecommunications services based on the identified previously provided telecommunications service and determines additional telecommunications services, distinct from the previously provided telecommunications service, desired by the party. The processor receives a selection from the party of the additional telecommunications services and processes a service request from the party based upon the selection by the party. A routing element suppresses routing of the call to a service center that provides the previously provided telecommunications service that was provided to the party, and routes the call to a service center that provides the additional telecommunications services selected by the party.

20 Claims, 2 Drawing Sheets

100

200

METHOD AND APPARATUS FOR PROPER ROUTING OF CUSTOMERS

CROSS-REFERENCE TO RELATED APPLICATIONS

The present application is a continuation application of pending U.S. application Ser. No. 11/157,775, filed on Jun. 21, 2005, the contents of which are expressly incorporated by reference in its entirety.

FIELD OF THE INVENTION

This invention relates generally to service center routing technologies, and more particularly to a method and apparatus for proper routing of customers.

BACKGROUND OF THE INVENTION

Service centers often have banks of representatives (agents) who serve a number of customer needs such as, for example, billing inquiries, request for new services, request for change of services, request for technical assistance after installation, and so on.

Typically, IVR (Interactive Voice Response) systems are utilized for routing customers according to exchanges with the customer. There are circumstances, however, where a customer is inadvertently routed to an inappropriate service or agent due to the limited information provided by the customer.

SUMMARY OF THE INVENTION

Embodiments in accordance with the invention provide a method and apparatus for proper routing of customers.

In a first embodiment of the present invention, a computer-readable storage medium operates as am interactive voice response (IVR) system accessible by a calling party over a communication system. The storage medium has computer instructions for retrieving historical information about a calling party, restricting access to one or more of a plurality of services according to the retrieved historical information, and processing a service request from the calling party according to the restricted services.

In a second embodiment of the present invention, a customer-agent routing system has a memory for storage, and a processor for controlling operations of the memory. The processor is programmed to retrieve from the memory historical information about a calling party, restrict access to one or more of a plurality of services according to the retrieved historical information, and process a service request from the calling party according to the restricted services.

In a third embodiment of the present invention, a method is provided for an interactive voice response (IVR) system. The method has the steps of retrieving historical information about a calling party, restricting access to one or more of a plurality of services according to the retrieved historical information, and processing a service request from the calling party according to the restricted services.

DETAILED DESCRIPTION OF THE DRAWINGS

Figure 1:
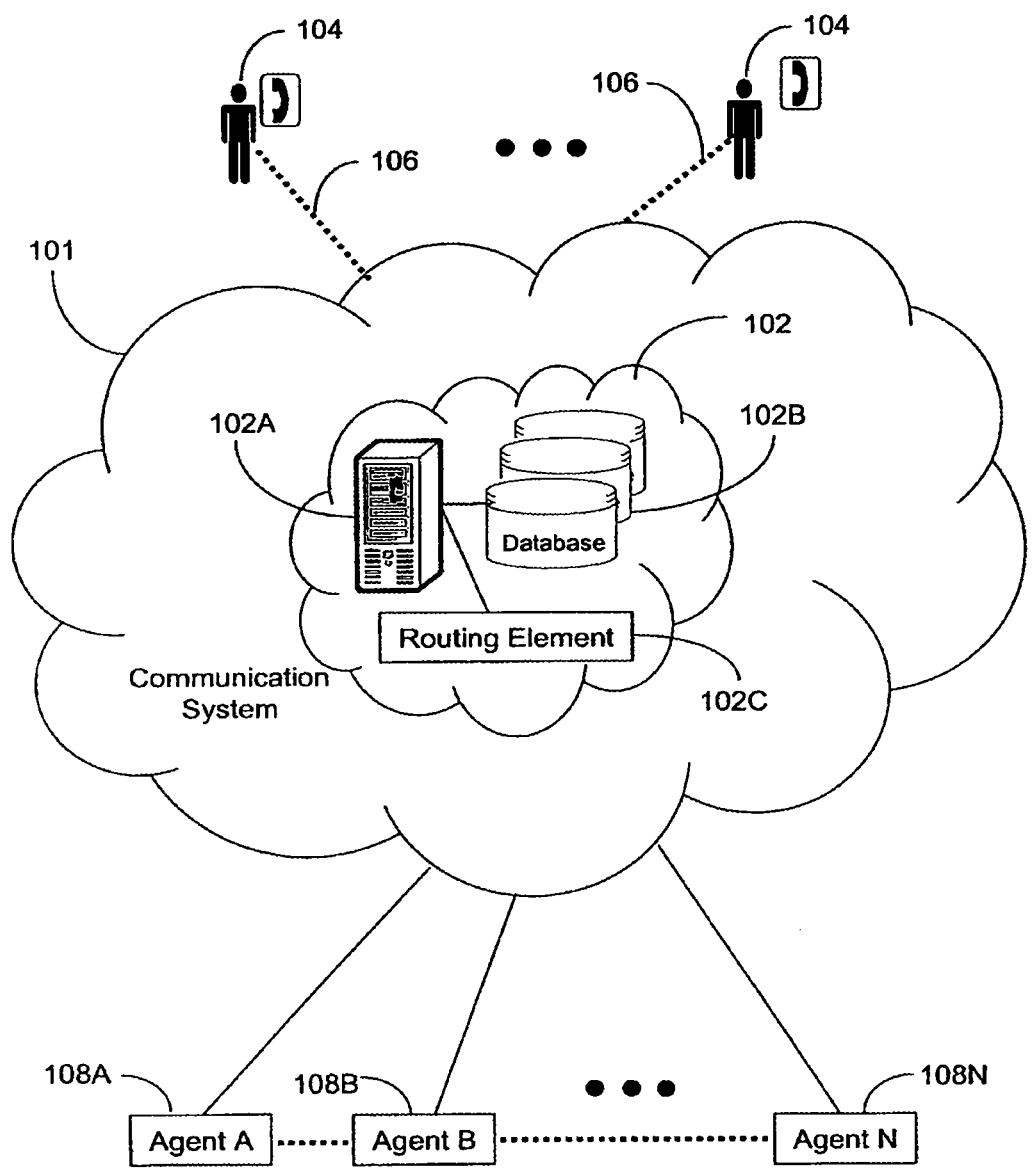
FIG. 1 is block diagram of a customer-agent routing system operating in a communication system according to an embodiment of the present invention.

While the specification concludes with claims defining the features of embodiments of the invention that are regarded as novel, it is believed that the embodiments of the invention will be better understood from a consideration of the following description in conjunction with the figures, in which like reference numerals are carried forward.

FIG. 1 is block diagram 100 of a customer-agent routing system 102 operating in a communication system 101 according to an embodiment of the present invention. The customer-agent routing system 102 comprises conventional technology such as a routing element 102C, a memory 102B, and processor 102A. The processor 102A can utilize one or more conventional computers or servers for controlling operations of the customer-agent routing system 102. The memory 102B utilizes one or more conventional media devices (such as a high capacity disk drive, Flash memory, Dynamic Random Access Memory, floppy disks, or other like memories) for storage purposes, and can be used for managing databases of a service provider of said system 102. The databases can be used for recording customer information such as, for example, billing information, services rendered, services pending, and other relevant information. Additionally, said databases can be managed by, for example, a conventional CRM (Customer Relations Management) system.

The routing element 102C can comprise conventional routing technology similar to that of an ACD (Automatic Call Distributor) for routing customers 104 to selected agents 108A-N coupled to the communication system 101. In the present context an agent 108 can be a human agent, or a computing system such as an IVR (Interactive Voice Response) system emulating a human agent by way of voice recognition technology and text-to-speech technology for exchanging messages with the customer 104. Additionally, each agent 108 can serve a specialized function such as for example, billing, technical support, new service installation, updating current services, and so on. The customer-agent routing system 102 can utilize the functionality of a conventional IVR system for interacting with the customer 104. Although the processor 102A, memory 102B and routing element 102C are shown separately, they can be in the alternative an integral unit.

It should also be noted that the communication system 101 can utilize wire line and/or wireless technologies for providing the customer 104 access to the customer-agent routing system 102 in a geographic region covered by said system 101. The customer 104 is coupled to the communication system 101 by way of a wire line or wireless interface 106 for exchanging communications.

Figure 2:
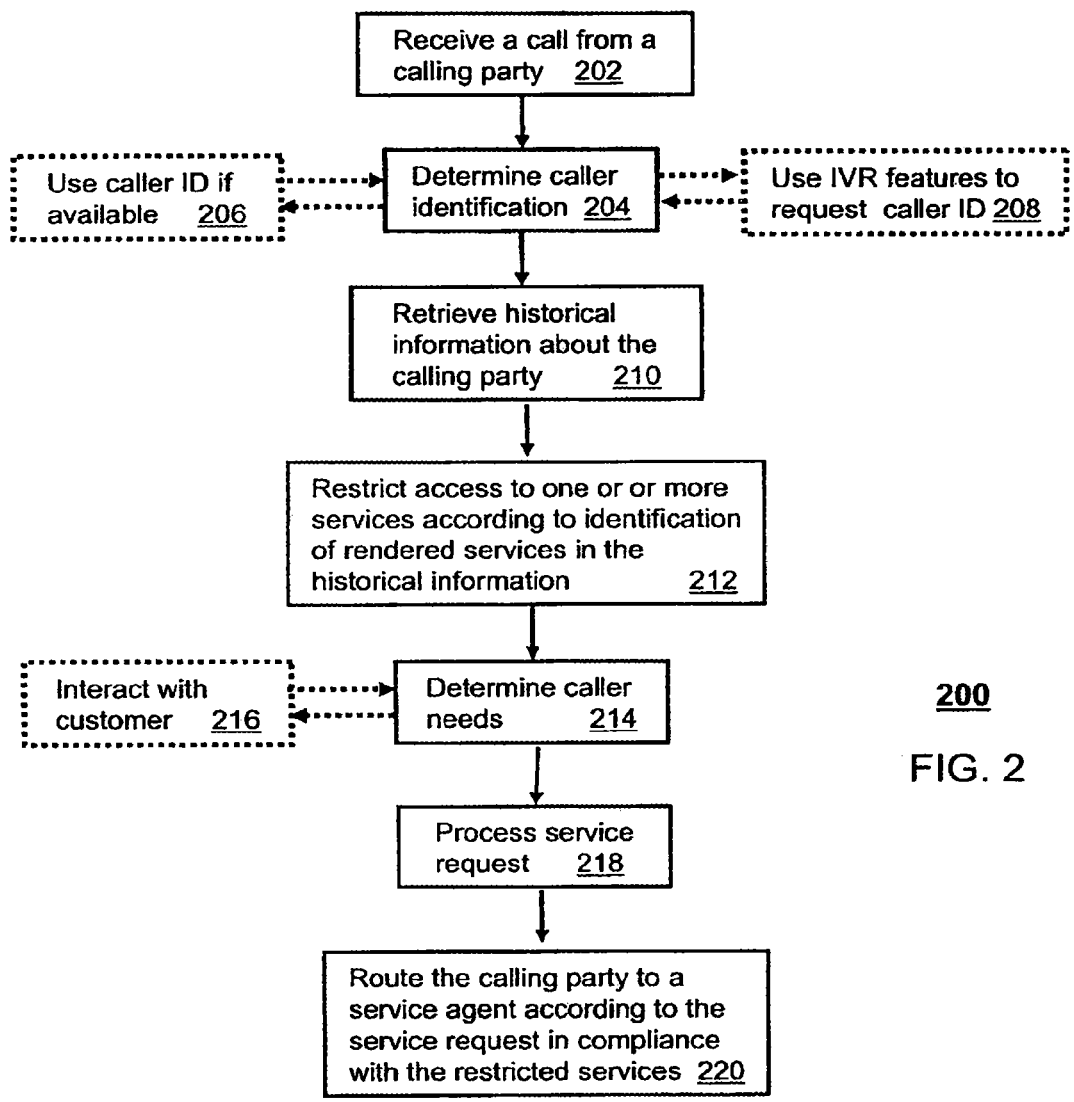
FIG. 2 depicts a flow chart of a method operating in the customer-agent routing system according to an embodiment of the present invention.

FIG. 2 depicts a flow chart of method 200 operating in the customer-agent routing system 102 according to an embodiment of the present invention. Method 200 begins with step 202 where a call is received from a calling party 104. In step 204, the customer-agent routing system 102 determines the caller's identification. This determination can be made in step 206 if a caller number of the calling party 104 is available, or in step 208 where the IVR functions of the customer-agent routing system 102 are used to interact with the calling party 104 to determine the caller's identification. Said interaction can take place by way of one or more voice responses and/or data responses (e.g., DTMF—Dual Tone Multi-Frequency Tones) provided by the calling party 104. The caller's identification can be a name, an address, billing account number, or any other form of identification useful for indexing through the databases of memory 102B to retrieve information about the calling party 104.

Once a caller ID is available, the customer-agent routing system 102 proceeds to step 210 to retrieve historical information about the calling party 104 from one or more of the databases 102B managed by the CRM. The historical information can be utilized to assess which services have and have not been rendered. With this information, the customer-agent routing system 102 can restrict access to one or more services according to rendered services identified in the retrieved historical information. Once these services have been flagged as restricted, the customer-agent routing system 102 proceeds to step 214 where it determines the caller's needs. This determination can be made by the IVR function of the customer-agent routing system 102 in step 216. In this step, the IVR interacts with the calling party 104 providing one or more selections to the calling party 104 to choose from. Said selection is limited, however, by the restricted services flagged in step 212. If, for example, specific installation services have already been provided to the calling party 104, the IVR will not offer said services as an option to the caller.

Once the calling party 104 makes a selection, the customer-agent routing system 102 proceeds to step 218 to process a service request from the calling party 104, thereafter routing in step 220 the calling party 104 to a service agent 108 according the service request and in compliance with the restricted services identified in step 212. An artisan with skill in the art will appreciate that the aforementioned embodiments substantially diminish the possibility that the calling party 104 will be routed to a service center 108 which has already rendered services, and wherein no further assistance can be provided. By suppressing inadvertent routes of a calling party to a service center 108 that can no longer render appropriate services, the present invention makes the service centers 108A-N more productive and efficient, while the calling party 104 can experience a more effective service response from the service provider's network 101.

It should be evident by now that the present invention can be realized in hardware, software, or a combination of hardware and software. Moreover, the present invention can be realized in a centralized fashion, or in a distributed fashion where different elements are spread across several interconnected processors. Any kind of computer device or other apparatus adapted for carrying out method 200 described above is suitable for the present invention.

Additionally, the present invention can be embedded in a computer program product, which comprises all the features enabling the implementation of method 200, and which when loaded in a computer system is able to carry out these methods as computer instructions. A computer program in the present context means any expression, in any language, code or notation, of a set of instructions intended to cause a system having an information processing capability to perform a particular function either directly or after either or both of the following: a) conversion to another language, code or notation; b) reproduction in a different material form.

It should be also evident that the present invention may be used for many applications. Thus, although the description is made for particular arrangements and methods, the intent and concept of the invention is suitable and applicable to other arrangements and applications not described herein. It would be clear therefore to those skilled in the art that modifications to the disclosed embodiments described herein could be effected without departing from the spirit and scope of the invention.

Accordingly, the described embodiments ought to be construed to be merely illustrative of some of the more prominent features and applications of the invention. It should also be understood that the claims are intended to cover the structures described herein as performing the recited function and not only structural equivalents. Therefore, equivalent structures that read on the description should also be construed to be inclusive of the scope of the invention as defined in the following claims. Thus, reference should be made to the following claims, rather than to the foregoing specification, as indicating the scope of the invention.

What is claimed is:

1. A method for managing access to telecommunications services using an interactive voice response (IVR) system, comprising:
   receiving a call from a party;
   retrieving account information about the party, the account information including historical information associated with the party;
   identifying a previously provided telecommunications service that was provided to the party, from the account information;
   restricting access, to the party, to a plurality of telecommunications services based on the identified previously provided telecommunications service from the account information;
   determining which of a plurality of additional telecommunications services, distinct from the previously provided telecommunications service, are desired by the party;
   receiving a selection from the party of one of the additional telecommunications services;
   processing, with a processor, a service request from the party based upon the selection by the party;
   suppressing, to prevent, routing of the call to a service center that provides the previously provided telecommunications service that was provided to the party and that does not provide any of the additional telecommunications services; and
   routing the call to a service center that provides the additional telecommunications service selected by the party.

2. The method according to claim 1, the routing further comprising routing the call from the service center to a service representative.

3. The method according to claim 1, further comprising interacting with the party to obtain identification information of the party.

4. The method according to claim 3, further comprising receiving the identification information from the party during the interaction.

5. The method according to claim 3, wherein the interacting comprises voice communication.

6. The method according to claim 3, wherein the interacting comprises data communication.

7. The method according to claim 1, further comprising determining a caller identity from a calling number for the party.

8. A non-transitory computer readable storage medium encoded with an executable computer program for providing an interactive voice response (IVR) service that is accessible by a calling party over a communications system and that, when executed by a processor, causes the processor to perform operations comprising:
   receiving a call from a party;
   retrieving account information about the party, the account information including historical information associated with the party;

identifying a previously provided telecommunications service that was provided to the party, from the account information;

restricting access, to the party, to a plurality of telecommunications services based on the identified previously provided telecommunications service from the account information;

determining which of a plurality of additional telecommunications services, distinct from the previously provided telecommunications service, are desired by the party;

receiving a selection from the party of one of the additional telecommunications services;

processing a service request from the party based upon the selection by the party;

suppressing, to prevent, routing of the call to a service center that provides the previously provided telecommunications service that was provided to the party and that does not provide any of the additional telecommunications services; and routing the call to a service center that provides the additional telecommunications service selected by the party.

9. The non-transitory computer readable storage medium of claim 8, wherein the routing further comprises routing the call from the service center to a service representative.

10. The non-transitory computer readable storage medium of claim 8, further comprising interacting with the party to obtain identification information of the party.

11. The non-transitory computer readable storage medium according to claim 10, further comprising receiving the identification information from the party during the interaction.

12. The non-transitory computer readable storage medium according to claim 10, wherein the interacting comprises voice communication.

13. The non-transitory computer readable storage medium according to claim 10, wherein the interacting comprises data communication.

14. The non-transitory computer readable storage medium according to claim 8, further comprising determining a caller identity from a calling number for the party.

15. A call routing system for managing access to telecommunications services, comprising:

a memory that stores account information about a calling party;

a processor that retrieves account information from the memory, the account information including historical information associated with the calling party, identifies a previously provided telecommunications service that was provided to the calling party, based on the account information, restricts access, to the calling party, to a plurality of telecommunications services based on the identified previously provided telecommunications service from the account information, determines which of a plurality of additional telecommunications services, distinct from the previously provided telecommunications service, are desired by the calling party; receives a selection from the calling party of one of the additional telecommunications services, and processes a service request from the calling party based upon the selection by the calling party, and a routing call distributor that suppresses, to prevent, routing of the call to a service center that provides the previously provided telecommunications service that was provided to the calling party and that does not provide any of the additional telecommunications services, and routes the call to a service center that provides the additional telecommunications service selected by the calling party.

16. The call routing system of claim 15, wherein the processor interacts with the calling party to obtain identification information of the calling party.

17. The call routing system of claim 16, wherein the processor receives the identification information from the calling party during the interaction.

18. The call routing system of claim 16, wherein the interaction comprises voice communication.

19. The call routing system according to claim 16, wherein the interaction comprises data communication.

20. The call routing system according to claim 15, wherein the processor determines a caller identity from a calling number for the calling party.

* * * * *